April 19, 1938.  S. B. GRISCOM ET AL  2,114,838
REGULATING SYSTEM
Filed Nov. 29, 1933  4 Sheets-Sheet 1

INVENTORS.
Samuel B. Griscom and
Homer C. Nycum.
BY
Franklin E. Hardy
ATTORNEY.

April 19, 1938.    S. B. GRISCOM ET AL    2,114,838
REGULATING SYSTEM
Filed Nov. 29, 1933    4 Sheets-Sheet 4

WITNESSES:
Leon J. Jaza
Wm. C. Groome

INVENTORS.
Samuel B. Griscom and
Homer C. Nycum.
BY Franklin E. Hardy
ATTORNEY

Patented Apr. 19, 1938

2,114,838

UNITED STATES PATENT OFFICE 2,114,838

REGULATING SYSTEM

Samuel B. Griscom, Pittsburgh, and Homer C. Nycum, Wilkinsburg, Pa., assignors to Westinghouse Electric & Manufacturing Company, East Pittsburgh, Pa., a corporation of Pennsylvania Application November 29, 1933, Serial No. 700,248

8 Claims. (Cl. 171—229)

Our invention relates to systems for regulating the excitation of electrical generators and particularly to the operation of such systems operated for the purpose of maintaining a desired voltage on the system and the stability of operation of the several generating units.

It is usual to so control the excitation of alternating-current generators as to secure the desired terminal or line voltage thereon, and some operators regard this as the sole purpose of controlling the excitation of generators. However, the ability of a generator to convert mechanical energy supplied to it into electrical energy is dependent upon the interaction of the armature and field fluxes of the magnetic circuit of the machine and, therefore, dependent upon the excitation of the machine field winding. It is, therefore, necessary that the generator excitation be maintained above certain minimum values for certain conditions of machine operation in order to prevent the machine from being unable to develop sufficient electrical energy to maintain it in synchronism with the power system to which it is connected.

The load on the usual power system is almost always at a lagging power factor, the usual values for metropolitan systems being between 80% and 85% at peak loads and somewhat lower at light loads. If the generator excitation is controlled solely with a view to maintain the desired generator voltage and without regard to the value of the load or its power factor, there are situations in which the excitation determined by the voltage regulator may result in insufficient excitation on some of the generators to maintain synchronous operation thereof with respect to the rest of the system.

Should the excitation on a generator become insufficient to maintain it in stable operation, a serious situation arises because when one generator pulls out of step from the system, it has the effect of a heavy reactive load on the system, causing the voltage to drop suddenly and often causing other generators to pull out of step. It is quite difficult for the operator to locate the particular generator at fault under these conditions, because the indicating instruments on all of the machines are usually swinging violently. It is, therefore, desirable that the generator excitation control be so arranged as to avoid the possibility of an unstable condition arising regardless of how the station operator attempts to operate the system.

It is an object of our invention to so control the excitation of electric generators supplying electrical energy to a power transmission system as to improve the stability of the system and avoid disturbances that may be caused by improper distribution of load between generators.

More specifically, it is an object of our invention to control the excitation of electric generators, both in accordance with the variations in the voltage of the power system from a desired value and in accordance with the load on the individual machines.

Other objects of our invention will appear from the following specification, describing our invention and certain specific embodiments thereof, when taken together with the accompanying drawings forming a part of this specification.

Figure 1:
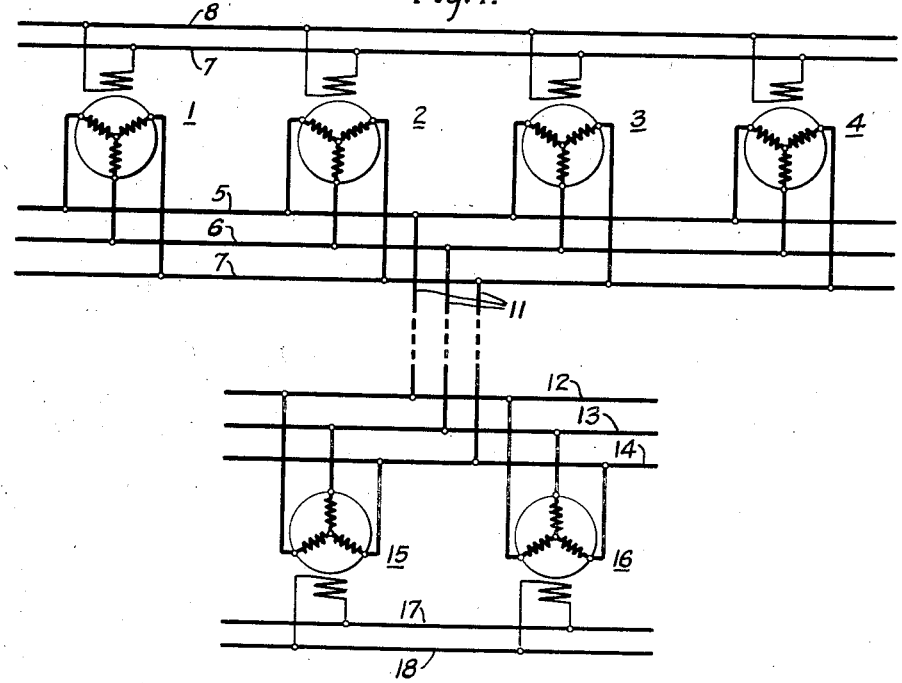
Figure 1 is a diagrammatic view illustrating a typical arrangement of generators operating in parallel.
Figure 4:
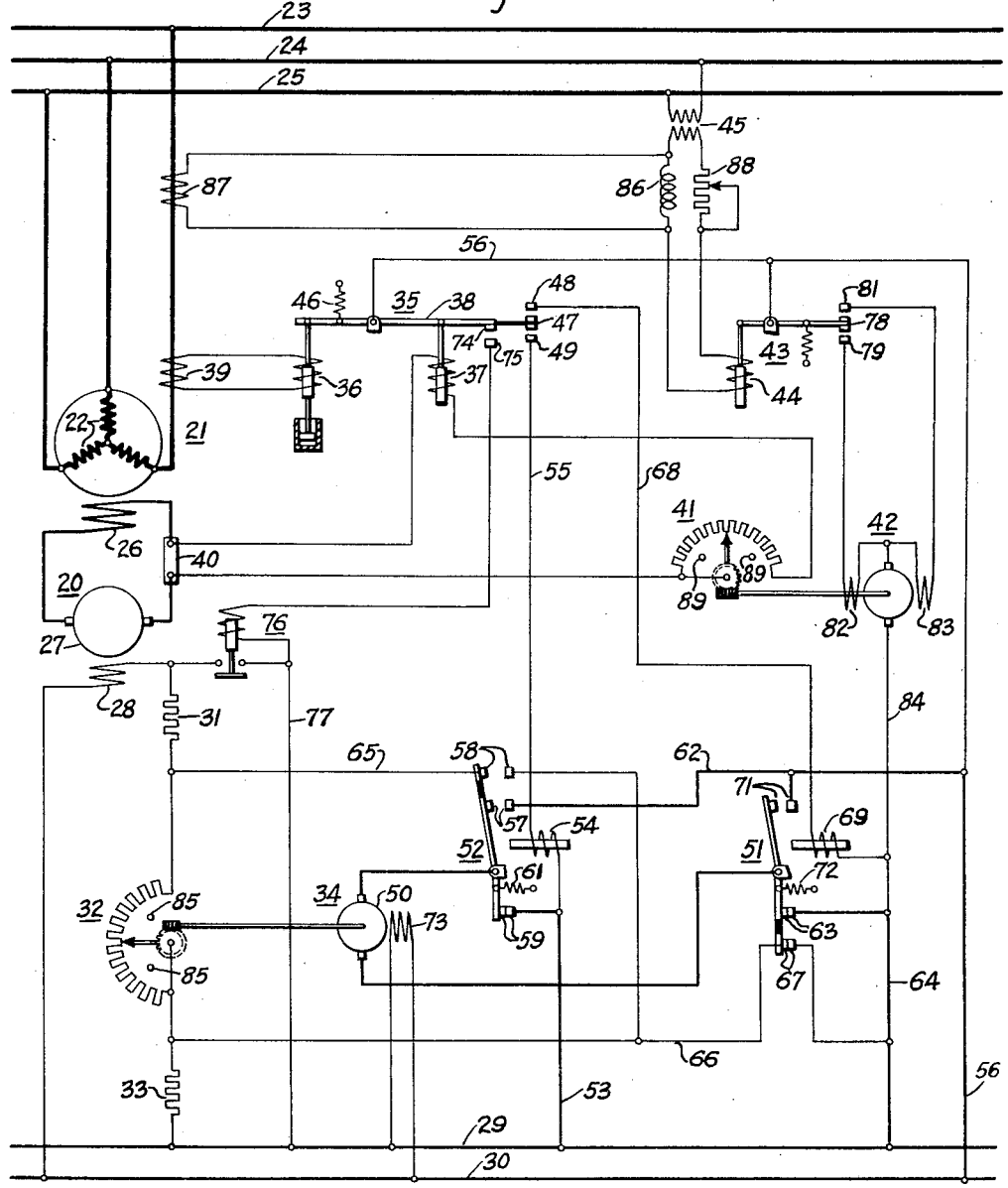
Figs. 4, 5 and 6 are diagrammatic views of specific arrangements of apparatus and circuits illustrating different preferred embodiments of our invention.
Figure 5:
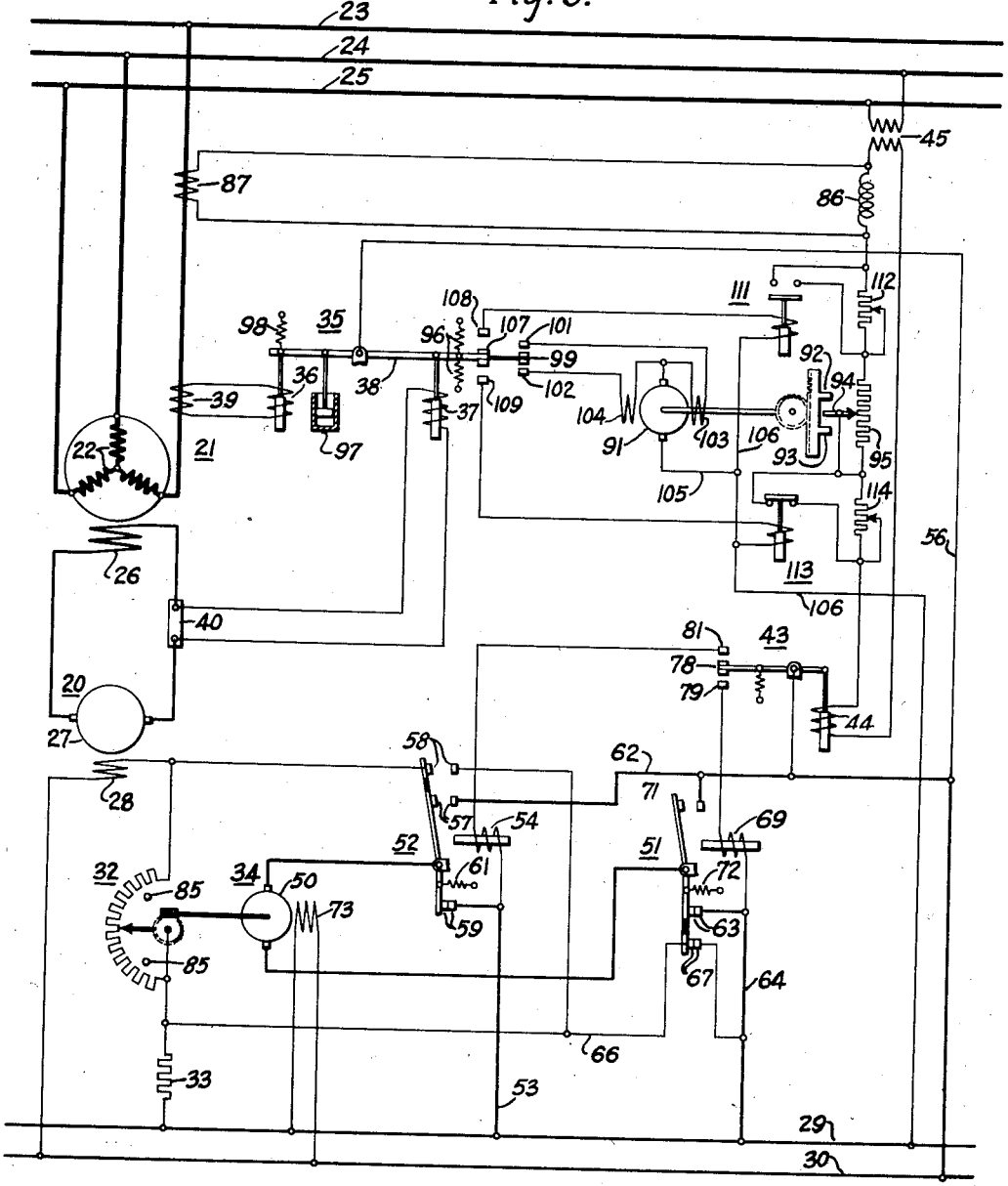
Figure 6:
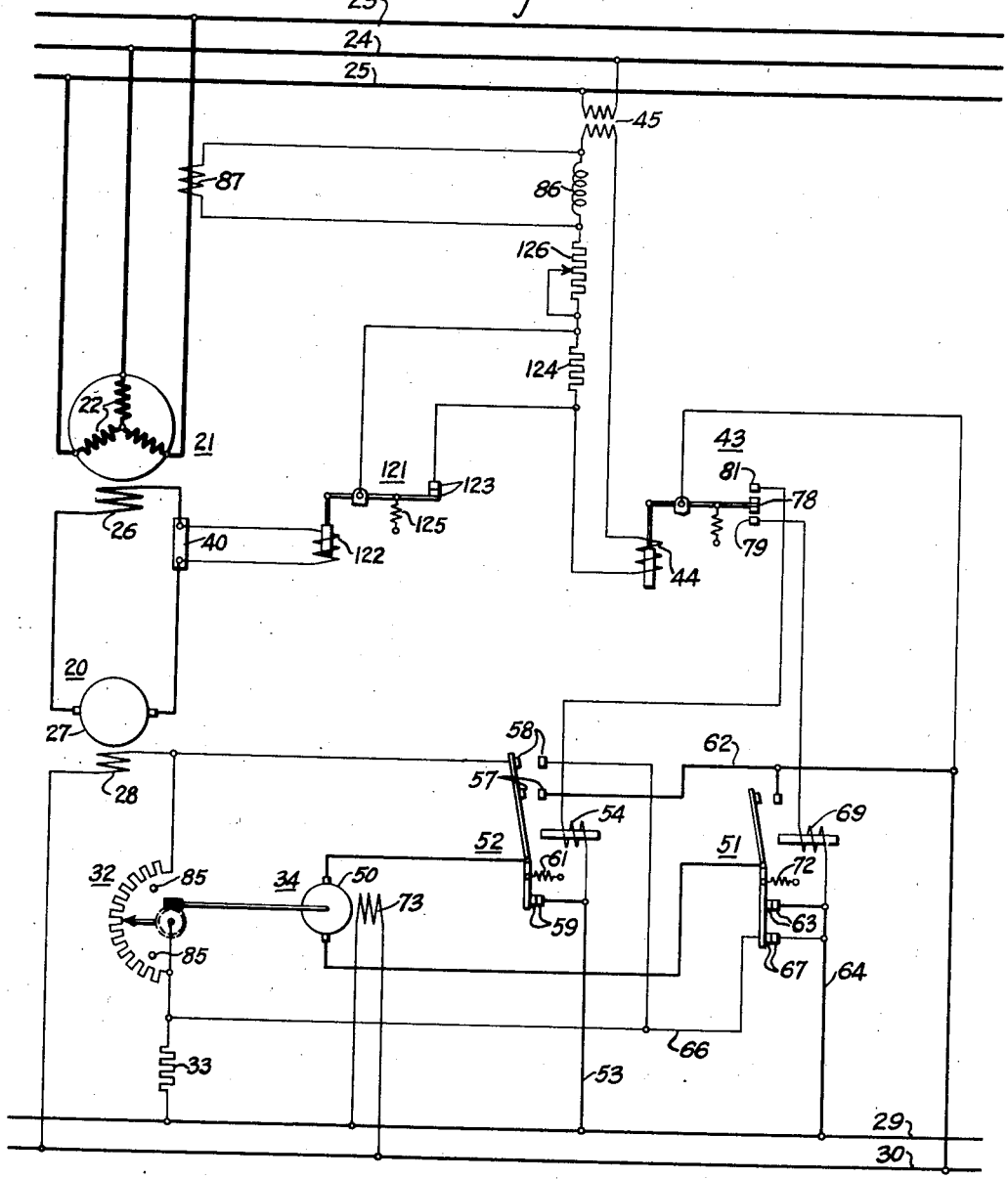

Referring to the drawings in which like numerals in the several figures represent corresponding parts, Fig. 1 illustrates a typical arrangement of generators operating in parallel in a power system, the generators 1, 2, 3 and 4 representing generators at one power station connected to common bus bars 5, 6 and 7, and having their field windings energized from a suitable source of direct-current power represented by conductors 8 and 9. It will be appreciated that, in practice, the field windings of each generator may be individually supplied from exciter generators separately provided therefor as shown in Figs. 4, 5 and 6. Because of the proximity of the generators 1 to 4, inclusive, there is substantially no reactance in the circuit connections between their terminals.

The station conductors or bus bars 5, 6 and 7 are connected by a transmission line 11 to similar conductors 12, 13 and 14 located in another station and supplied with power from the generators 15 and 16 connected thereto, the field windings of which may be energized from a common source represented by conductors 17 and 18. The generators 15 and 16 are, like the generators 1, 2, 3 and 4, operated directly in parallel with substantially no reactance between their terminals but a substantial reactance exists in the interstation tie-line 11 between two generator stations. It will be understood that each of the generators 1, 2, 3, 4, 15 and 16 will be provided with an automatic voltage regulator and with control rheostats for manually controlling the excitation thereof. These devices are well known and are not shown in the diagrammatic representation of Fig. 1, but specific embodiments thereof are shown in other figures of the drawings.

In the system in which there is but a single generator, the excitation requirements necessary to secure proper generator terminal voltage and stability of operation are the same. That is, as load comes on the generator, the terminal voltage tends to drop, requiring an increased excitation to maintain voltage. The field strength, therefore, is increased by the action of the voltage regulator and results both in maintaining the desired voltage on the machine and in improving the stability of operation under the increased load.

Figure 2:
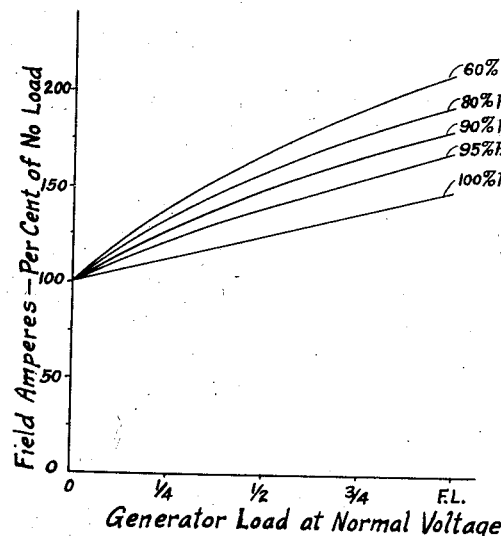
Fig. 2 illustrates a curve showing the excitation required to maintain normal terminal voltage on a typical generator at varying loads on the generator and at varying power factors.

The curve in Fig. 2 shows the excitation required to maintain the normal generator terminal voltage with different loads and at different power factors. It will be seen that the excitation required is equal to a minimum amount required to produce normal voltage at no load, plus an amount that varies with the armature current and power factor and is greater at the lower power factors.

Figure 3:
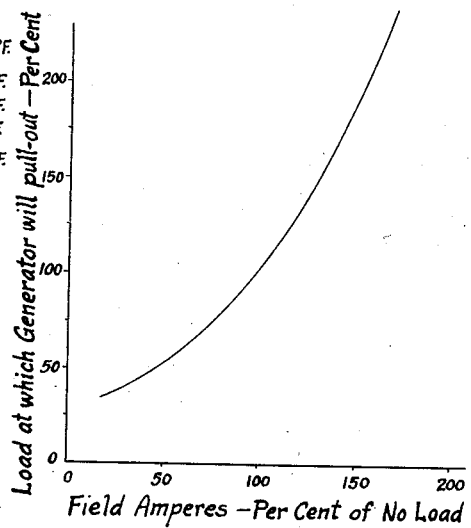
Fig. 3 illustrates a curve showing the excitation required for a single generating unit operating in parallel with a system to maintain it in stable operating condition with respect to the system.

Fig. 3 illustrates a curve showing the excitation requirements, from the standpoint of stability of operation, for a typical single generator unit operating in parallel with a system. It will be appreciated that the curve represents a typical generator and that the characteristics of individual machines will vary somewhat. It will be seen by reference to Fig. 3 that full load on the generating unit can be carried at any excitation in excess of that required for normal voltage at no load. By reference to Fig. 2, it will be observed that if the excitation is so adjusted as to secure normal voltage with the normal range of load power factors, a stable condition of operation will exist at all times. It should be pointed out, however, that the curve in Fig. 3 represents the static stability limit or minimum required excitation below which the generator is in an unstable condition. Since load swings or oscillations are always likely to occur and are always present to a certain degree, safe operation requires that the generator be continuously operated with an excitation somewhat above the value shown by the curve in Fig. 3 as the limit or minimum for stable operation.

By a comparison of the curves in Figs. 2 and 3, and from the discussion above, it will be seen that the generator excitation can be so controlled as to secure proper voltage and proper stability characteristics simultaneously.

It will first be pointed out how conventional control of the generator excitation by voltage regulators can cause the excitation of one or more of the generators to be reduced to an unstable value. It is customary in applying voltage regulators to the generators of a station, such as illustrated in Fig. 1, to adjust the control element of the voltage regulator to be responsive to variations in voltage of the station bus, that is, conductors 5, 6 and 7 for generators 1, 2, 3 and 4, and conductors 12, 13 and 14 for generators 15 and 16, but to add to this voltage a certain increment of voltage that is proportional to the lagging reactive current output of the individual generator. This adjustment of the regulating element gives to each generator a drooping voltage characteristic with increasing reactive load, and tends to limit or prevent circulating current between the parallel connected machines of a station. This adjustment of the regulator to produce a drooping voltage characteristic with an increase in reactive load on the generator provides what is known as "cross-current compensation", a customary practice, and its effect is a necessary condition for the successful parallel operation of the generators connected to the same station conductors and individually regulated in order to prevent circulating reactive currents between generating units.

In the operation of two or more generating stations connected in parallel, as shown in Fig. 1, the reactance of the interstation tie or transmission line 11 is ordinarily sufficient to secure the same result between the stations as is secured artificially between generators of the same station by the above-described cross-current compensation so that such compensation between the stations is usually unnecessary.

If now generators 1, 2 and 3 are operating fully loaded and generator 4 is operating at very light load, with the loading of the individual generators controlled independently of their voltage, by normal governor control, an increase in the total system load would result in an increase in the load taken by the generator 4. This increase in the load on the generator 4 will tend to cause the voltage of the station bus to decrease, thus requiring an increase of excitation of the generators to maintain a desired voltage. With the resulting increase in excitation on all of the generators, the several generators would pick up approximately proportionate amounts in wattless current so that the increase of the excitation of the generator 4 would be proportionate to only one-sixth of the amount it should be to maintain the desired balance of excitation between the several machines.

Therefore, an increase in the loading of the generator 4 from substantially no load to approximately full load would not be accompanied by a corresponding increase in the excitation of the generator to maintain stability. It is usual, in such cases, for the station operator to readjust the voltage rheostat of the generator 4 to balance its power factor with that of the other generators in the station, and if load changes are slow, successful operation of this character may be performed. In cases, however, where load increases suddenly, such as may be occasioned by the interruption of a transmission line receiving load from another station, an operator would not be able to act quickly enough to adjust the voltages of the generators. Also, in the case of a large generating unit tripping out of service for any reason, the field adjustments of the remaining generators could not be made instantaneously.

Another operating condition that might result in instability is where the generators of one station, such as generators 15 and 16, are maintained at substantially full load operation during a decrease in system load. Because of the decrease in system load, the system voltage tends to rise and the voltage regulators automatically decrease the excitation of the generators 15 and 16 in order to maintain the desired voltage on these machines. If, under these conditions, the voltage of an interconnected station, such as that represented by the generators 1, 2, 3 and 4, is not similarly reduced, an unstable condition between the two stations can quickly arise.

From the foregoing explanation it will be apparent that the desirable condition of excitation of parallel connected generators of a power system requires that the excitation should be varied in accordance with the load on the individual machines within such a range as to permit proper system voltage and to secure stable operating conditions of the machines, Referring to Fig. 4 of the drawings, in which an excitation control system is illustrated that is governed both in accordance with changes in the voltage of the power system and in accordance with the load upon the generator to maintain a stable operation thereof, a generator 21 is illustrated having an armature winding 22, connected to three-phase conductors 23, 24 and 25, and a field winding 26 that is connected to the armature winding 27 of an exciter generator 20 which is in turn provided with a field winding 28 connected to be energized from supply circuit conductors 29 and 30 by a circuit that includes a resistor 31, rheostat 32 and resistor 33. The field control rheostat 32 is operated by a motor 34, controlled by means of a balance relay 35 in which a force that is proportional to armature power plus a fixed amount is balanced against a force that is proportional to the generator field current. If desired, a watt-responsive element might be used in place of the current responsive element of the relay. The differentially related electromagnets 36 and 37 exert opposite pulls on the contact-carrying bar 38 that are proportional, respectively, to the armature current received from the current transformer 39 and to the field current as received from the shunt 40.

An adjustable rheostat 41 is provided in circuit with the winding of the electromagnet 37, that is responsive to the generator field current, to adjust the proportionality between the armature current and the field current necessary to operate the contacts of the relay 35. The rheostat 41 is actuated by a motor 42 in accordance with the operation of a contact-making voltmeter relay 43, the operating winding 44 of which is connected by means of the transformer 45 to be energized in accordance with the voltage of the power circuit represented by conductors 24 and 25. The circuit to the operating winding 44 of the voltage regulator includes a reactor 86 connected to a current transformer 87 in the generator load connected to the line conductor 23 to effect cross-current for manually adjusting the setting of the regulator.

The contact-carrying bar 38 of the relay 35 is also provided with a spring 46 for producing a fixed force which, together with the force due to armature current, acting upon the electromagnet 36, opposes the force that is proportional to the field current, acting upon the electromagnet 37, and operates the movable contact member 47 which, upon engagement with the one or the other of the fixed contact members 48 or 49, effects operation of the reversing switch 51 or 52, respectively, and the direction of operation of the motor 34.

Upon engagement of the contact members 47 and 49, a circuit is closed from the supply conductor 29 through conductor 53, the operating winding 54 of the switch 52, conductor 55, contact members 49 and 47, and by conductor 56 to the supply conductor 30, thus operating the reversing switch 52 in a direction to cause engagement of the cooperating pairs of contact members 57 and 58, respectively, and separation of the pair of cooperating contact members 59 as the contact-carrying switch arm is operated against the pull of a spring 61. Engagement of the pair of contact members 57 of the switch 52 closes a circuit from the supply conductor 30 through conductors 56, 62, contact members 57, armature winding 50 of the motor 34, contact members 63 of the reversing switch 51, and conductor 64 to the supply conductor 29, thus closing a circuit through the motor 34 for operating it, and the rheostat 32 in a direction to raise the voltage on the field windings 28 and 26, respectively, of the exciter 20 and the generator 21. The field winding 73 of the motor 34 is continuously energized in one direction from the supply conductors 29 and 30.

Engagement of the contact members 58 closes a circuit in shunt relation to the rheostat 32 and the resistor 33 from the lower end of the resistor 31 through conductor 65, contact members 58, conductor 66, contact members 67 of the switch 51, and conductor 64 to the supply conductor 29, to temporarily boost the voltage of the exciter field winding 28 while the switch 52 is in its motor operating position. Upon separation of the contact members 47 and 49 the above traced operating circuit for the switch 52 is interrupted, and the switch is operated to its illustrated position by the spring 61.

If the contact member 47 engages the contact member 48, a similar circuit is closed for operating the switch 51 to its motor operating position. This circuit is traced from the supply conductor 30, through conductor 56 to the relay 35, through contact members 47 and 48, conductor 68 to the operating winding 69 of the switch 51, and by conductor 64 to the supply conductor 29. Upon closing of the above traced circuit, the armature of the switch 51 is actuated against the pull of a spring 72 to cause engagement of the cooperating pair of contact members 71 and separation of the pairs of cooperating contact members 63 and 67. Engagement of the pair of contact members 71 closes a circuit from the supply conductor 30 through conductors 56 and 62, contact members 71 of the switch 51, armature winding 50 of the motor 34 in the opposite direction to that traced above, the contact members 59 of the switch 52, and by conductor 53 to the supply conductor 29, to cause the motor 34 to operate in a direction to decrease the voltage of the field winding 28 of the exciter 20, thus decreasing the voltage of the exciter 20 and of the generator 21. Separation of the cooperating contact members 67 removes a normally closed circuit in shunt relation to a resistor 33 extending through the conductor 66, contact members 67, and conductor 64, thus inserting the resistor 33 in circuit with the field winding 28 and temporarily forcing the excitation of the field winding to a lower value.

Should the force causing movement of the contact-carrying arm 38 in a direction to cause engagement of the contact members 47 and 49 be considerable, the contact arm will continue to rotate after engagement of these contact members until contact members 74 and 75 are brought into engagement and close a circuit through the winding of the relay 76 causing it to operate in a circuit closing direction to close a circuit through the conductor 77 in shunt relation to the resistor 31, rheostat 32, and resistor 33, thus more rapidly forcing the voltage on the field winding 28 to a higher value to increase the generator voltage at a very rapid rate.

If the voltage on the power circuit 23, 24, 25 increases, the voltage applied through the transformer 45 to the winding 44 correspondingly increases, causing the relay 43 to operate in a direction to close a circuit through the contact members 78 and 79 to operate the motor 42 in a direction to strengthen the pull on the winding of the electromagnet 37, thus causing the arm 38 to swing in a counter-clockwise direction and effect operation of the rheostat 32 in a direction to decrease the excitation of the generator 21. This circuit is traced from the supply conductor 30 by conductor 56, contact members 78 and 79 on the relay 43, the field winding 82, the armature winding of the motor 42 and conductors 84 and 64 to the supply conductor 29. If the voltage on the power circuit 23, 24, 25 decreases below its desired value, the contact member 78 will be operated to engage the contact member 81 thus closing a circuit from supply conductor 30 through conductor 56, contact members 78, 81, field winding 83 of the motor 42, through the armature winding of the motor, and through conductors 84 and 64 to the supply conductor 29, causing the motor 42 to be operated in a direction to weaken the pull on the magnet 37.

The motor operated rheostat 32 in the field circuit of the exciter is provided with stops 85 to limit the range of control within such values as are predetermined to be safe from the standpoint of stability of operation of the system. If the setting of this rheostat is such that the generator is operating on a 95% power factor curve, as shown in Fig. 2, and at one-fourth load with normal voltage and an increase in load on the generator occurs, the armature current of the generator will increase and the armature current coil of the electromagnet 36 will overcome the pull of the electromagnet 37 causing the relay 35 to move its contact-carrying bar in a clockwise direction, thus closing the contacts 47 and 49 to control the exciter to increase the voltage on the main generator 21. If the increased load added to the generator happens to also be a 95% power factor load, the generator field current will be increased until the balance relay 35 opens its contacts, at which time the generator may be operating at a new load, but with the same power factor and approximately the same voltage as before. If the load added to the system was at a different power factor than the load already carried by the generator, say 80% the generator voltage will still be low after the balance relay 35 has opened its contacts. This would cause the voltage regulator relay 43 to operate in a direction to close its contact members 78 and 81 and effect operation of the motor 42 and the rheostat 41 in a direction to change the current ratio between the armature and field winding currents of the generator 21, and again cause the relay 35 to close its contacts in a direction to increase the excitation of the generator. The control system would finally come to rest with substantially normal voltage and with the generator operating at a slightly lower power factor than before because of the lower power factor of the added load.

With the above-described control system, the excitation of the generator 21 is increased as load comes on, the amount of the increase depending upon the power factor of the load. Stops 89 are provided on the rheostat 41 so that should the operator attempt to pull the bus voltage of his station to a low value by a manipulation of his own hand operated rheostat 88 instead of having the other station reduce its voltage to correspond, a limit would be reached beyond which the motor operated rheostat 41 in the field current coil of the balance relay 35 would not operate, and these stops would be so set that the position of the rheostat 41 would be such as to be safe for stable operation of the system.

Fig. 5 of the drawings illustrates another embodiment of our invention in which means is provided for insuring that the voltage regulator will not decrease the excitation of the generator sufficiently to produce instability of operation thereof. A voltage regulator that is represented by the contact-making voltmeter relay 43, is provided and is similar to the like numbered relay in Fig. 4, and has its contact members connected to control the motor reversing switches 51 and 52 for controlling the operation of the rheostat motor 34 that actuates the field rheostat 32.

The armature current-field current balance relay 35 controls a motor 91 for the purpose of varying the positions of stops 92 and 93 that limit the movement of the rheostat contact arm 94 of a manually-operable adjusting rheostat 95 that is connected in circuit with the operating winding 44 of the contact-making voltmeter 43. The moving part of the relay 35 is actuated by the electromagnets 36 and 37 and the biasing spring 98, and is held by biasing springs 96 in such manner that the relay contact members are not brought into engagement unless the relationship between the armature current and the field current exceeds a certain predetermined amount in either direction from a desired value. A dashpot 97 is employed to prevent sudden temporary changes of current, such as might be caused by short circuits, from operating the relay 35.

Operation of the relay 35, in the one or the other direction, causes engagement of the movable contact member 99 with the contact member 101, or the contact member 102, closing a circuit to operate the motor 91 in the one or the other direction. This circuit is traced from the supply circuit conductor 30 through conductor 56, relay 35, contact members 99 and 101 and field winding 103, or contact members 99 and 102 and field winding 104, the armature winding 91 and conductors 105 and 106 to supply conductor 29. The operation of the motor 91 not only sets the stops 92 and 93 to limit the range of adjustment that may be manually made of the contact member 94, but it will also move this contact member in the one direction or the other along resistor 95 to keep it within a range dependent upon the positions of the stops 92 and 93.

Should the force moving the contact member 99 upwardly, be considerably in excess of that required to make engagement of that contact with the contact member 101, a contact member 107 will engage the contact member 108 and cause energization of the operating winding of a relay 111 which moves upwardly and short circuits a resistor 112 that is in circuit with the winding 44 of the voltage regulator 43. Similarly, should the balance relay 35 operate in a direction to cause engagement of the contact members 99 and 102 with sufficient force, the contact member 107 will continue to move and engage the contact member 109 and close a circuit through the operating winding of a relay 113 which will operate to open a circuit in shunt relation to a resistor 114 and introduce it in circuit with the winding 44 of the voltage regulator 43. The voltage regulator 43 is also, as is the regulator in Fig. 4, provided with a compensator 86 in circuit therewith that is so connected to the secondary winding of a current transformer 87 as to introduce into the circuit of the voltage regulator a component of voltage that is proportional to the wattless current of the generator 21 in order to provide for cross-current compensation between that generator and others operating in parallel with it.

It will be apparent that in the system illustrated in Fig. 5, the voltage regulator 43 will control the excitation of the generator 21 by controlling the operation of the field rheostat 32 in accordance with variations in voltage on the power circuit 23, 24, 25 so long as the excitation of the generator remains within a range corresponding to the stable operating conditions of the machine. If, however, at any time, the generator excitation should drop below the safe stability limit for the amount of load being carried on the generator at that time, the relay 35 will operate to close contacts for controlling the operation of the motor 91 in a direction to move the stops 92 and 93 on the voltage adjusting rheostat in a direction to bring the excitation within the proper range. Should this operation not occur with sufficient speed to insure maintaining the stable conditions of the generator, the contact members for controlling the relay 111, or the relay 113, will be brought into engagement causing the one or the other of these relays to operate and to temporarily give the voltage regulator 43 a bias in the one or the other direction to cause operation of the rheostat 32 prior to completion of the setting of the stops 92 and 93. It will be observed that the operator may at any time adjust the voltage rheostat 95 within the safe stability operation limits of the machine, as determined by the positions of the stops 92 and 93.

Referring to Fig. 6 of the drawings, an embodiment of the invention is illustrated in which the voltage regulator 43 controls the operation of the field rheostat motor 34 and field rheostat 32 in the same manner as in the embodiment of the invention illustrated in Fig. 5. In this embodiment, an undercurrent relay 121 is provided having an operating coil 122 energized from the shunt 40 in accordance with the current flowing in the generator field circuit. The relay is provided with contact members 123 that normally close a circuit in shunt relation to a resistor 124 as the result of the pull caused by current flowing in the winding 122 from the shunt 40 in circuit with the generator field winding 26. Should the field current of the generator 21 be reduced below a predetermined minimum, the pull of the coil 122 would be overcome by the opposing pull of the spring 125 and the relay would operate to separate the contact members 123 and introduce a resistor 124 in circuit with the winding 44 of the regulator 43, thus causing the regulator to operate in a direction to increase the excitation of the generator 21. A manually adjustable rheostat 126 is also provided in circuit with the winding 44 of the regulator.

The relay 21 is, in effect, a field limiting relay for insuring that the current of the field winding of the generator 21 will not fall below a predetermined value for which the relay is set to operate. As may be seen by a study of the curves shown in Figs. 2 and 3 of the drawings, the operation of the generator 21 will ordinarily be within its stability limits if the field current of the generator is prevented from falling below an amount slightly above that required for normal voltage at no load. If the voltage regulator attempts to reduce the excitation beyond this minimum point, the relay 121 operates to introduce the resistor 124 in circuit with the operating winding of the regulator 43, giving the regulator the effect of a lower voltage on the transmission line and causing it to operate to raise the excitation of the generator.

Many modifications of the circuits and apparatus illustrated may be made within the spirit of our invention, and we do not wish to be limited otherwise than by the scope of the appended claims.

We claim as our invention:

1. In a system comprising an alternating-current power circuit including synchronous apparatus, a dynamo-electric machine connected thereto, and excitation-adjusting means for the machine, the combination of regulating means for adjusting the excitation of said machine comprising a regulating relay responsive to the voltage of the machine and a regulating relay actuated by two interconnected electromagnets arranged to exert opposite pulls that are proportional, respectively, to machine excitation and to the machine load, said two regulating relays being cooperatively related to maintain the machine excitation sufficiently high to ensure synchronous operation with the power circuit.

2. In a system comprising an alternating-current power circuit including synchronous apparatus, a dynamo-electric machine connected thereto, excitation-adjusting means for the machine and a regulator responsive to the voltage of the machine for controlling said adjusting means, the combination of regulating means for modifying the effective range of operation governed by said voltage regulator to maintain the machine excitation sufficiently high to ensure synchronous operation with the power circuit and comprising a relay having a movable circuit controlling member controlled by two interconnected electromagnets arranged to exert opposite pulls that are proportional, respectively, to machine excitation and to the machine load.

3. In a system comprising an alternating-current power circuit including synchronous apparatus, a dynamo-electric machine connected thereto, excitation-adjusting means for the machine and a regulator responsive to the voltage of the machine for controlling said adjusting means, the combination of means including a relay operable at all times in accordance with a differential relation between the exciting current and the load current of said machine for controlling the calibration of said regulator to adjust its range of operation in such manner that at all times it maintains the machine excitation sufficiently high to ensure synchronous operation with the power circuit.

4. In a system comprising an alternating-current power circuit including synchronous apparatus, a dynamo-electric machine connected thereto, excitation-adjusting means for the machine and a regulator responsive to the voltage of the machine for controlling said adjusting means, the combination of a relay responsive to a predetermined relation between the exciting current and the load current of said machine, means responsive to small deviations in the relation to which said relay is sensitive for gradually altering the calibration of said regulator, and means responsive to larger deviations for effecting abrupt changes in said calibration, the effect of said alterations being to cause the regulator at all times to maintain the machine excitation sufficiently high to ensure synchronous operation with the power circuit.

5. In a system comprising an alternating-current power circuit including synchronous apparatus, a dynamo-electric machine connected thereto, and excitation-adjusting means for the machine, the combination of a relay adapted to control said adjusting means in response to a predetermined relation between the excitation and load current of the machine, and means responsive to the machine voltage for supervising the relation to which said relay is sensitive in a manner that the relay at all times maintains the machine excitation at a value sufficient to ensure synchronous operation with the power circuit.

6. In a system comprising an alternating-current power circuit including synchronous apparatus, a dynamo-electric machine connected thereto, and excitation-adjusting means for the machine, the combination of a relay having differentially related elements respectively responsive to the load current and the excitation of the machine adapted to control said adjusting means, and means responsive to the machine voltage for altering the responsiveness of the excitation element of said relay in a manner to cause the relay at all times to maintain the machine excitation at a value sufficient to ensure synchronous operation with the power circuit.

7. In a regulator system, in combination, an alternating current power circuit, a synchronous dynamo-electric machine connected thereto, and regulating means for controlling the excitation thereof in response to three regulating elements continuously energized, respectively, in accordance with the armature current of said machine, the field current of said machine, and the voltage of said power circuit, said first two named elements being differentially related to limit the permissible minimum field current in accordance with variations in the armature current.

8. In a regulator system, in combination, an alternating current power circuit, a synchronous dynamo-electric machine connected thereto, and regulating means comprising two control relays, one of which is differentially responsive to the armature current and the field current of said machine, and the other of which is responsive to power circuit voltage, one of said relays controlling the excitation of said machine, and the other of said relays controlling the calibration of the first relay to limit its range of operation for insuring sufficient excitation at all machine loads for maintaining the flow of synchronizing current between said machine and said power circuit for maintaining operation of said machine in synchronism with the power circuit.

SAMUEL B. GRISCOM.
H. C. NYCUM.